March 14, 1944.  E. S. HEBELER  2,343,864
WELDER'S MASK OR HELMET
Filed March 26, 1942
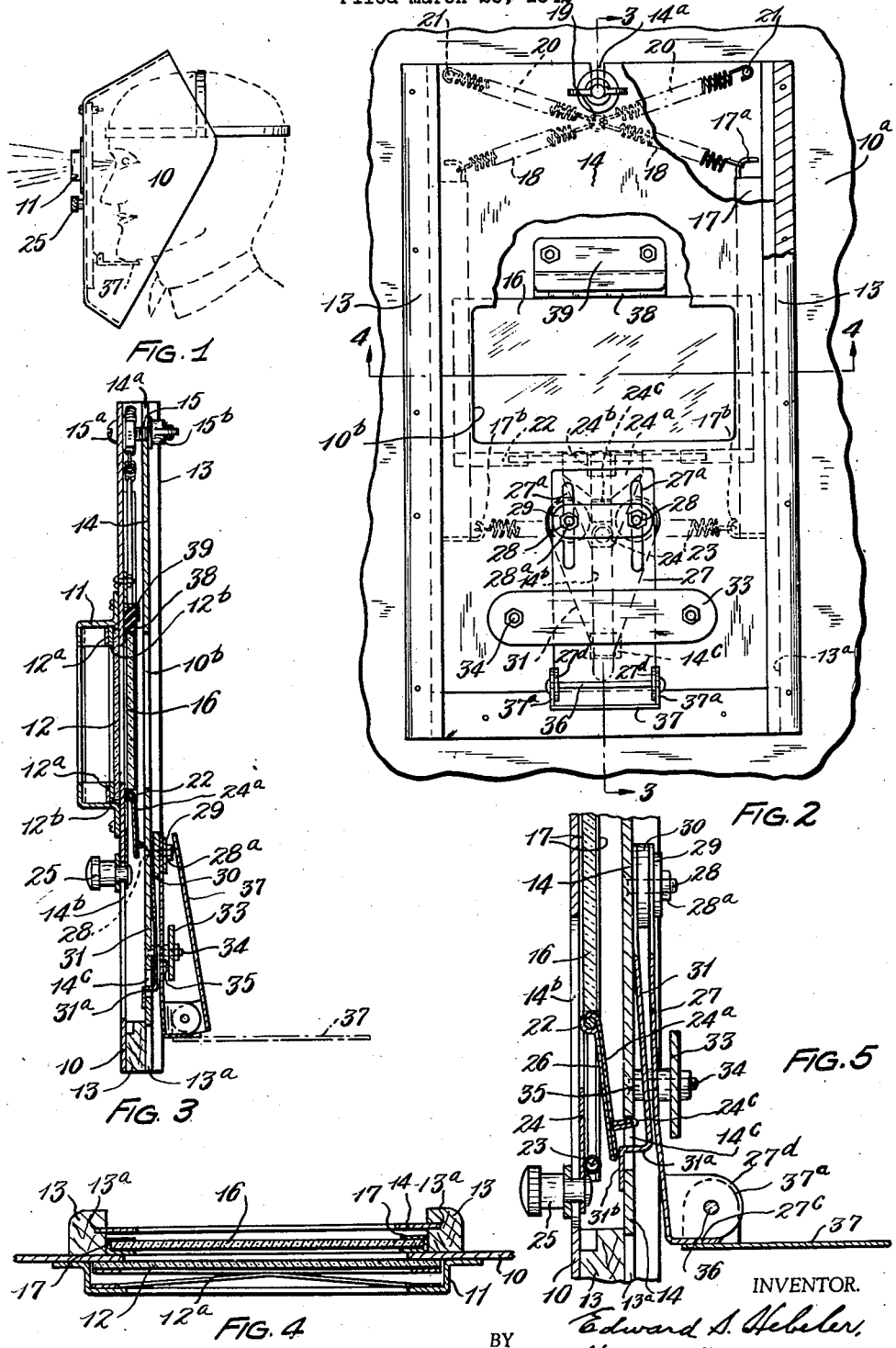
INVENTOR.
Edward S. Hebeler,
BY Hull & West,
ATTORNEYS.

Patented Mar. 14, 1944

2,343,864

UNITED STATES PATENT OFFICE 2,343,864

WELDER'S MASK OR HELMET

Edward S. Hebeler, Williamsville, N. Y., assignor of one-half to Unit Rays, Inc., Cleveland, Ohio, a corporation of Ohio Application March 26, 1942, Serial No. 436,341

9 Claims. (Cl. 2—8)

This invention relates to the art of welding, and more particularly to what are known in that art as welders' masks or helmets, which are used by those performing metal welding and cutting operations for the purpose of shielding their eyes from the impact of the brilliant rays emitted during the operations of electric and torch welding, as well as during the operations of torch cutting.

The said masks or helmets are usually provided with a protective shield of transparent material, such as glass or fire resistant transparent plastic material, extending across the vision opening and which will enable the operator to position his welding rod or his torch with reference to the work and also protect his face and eyes against impact by the hot scale produced by the cutting or welding operations and which it is desirable to remove from the work promptly after such operation. In addition, some of the prior masks or helmets have been provided with a shield of partly opaque colored material capable of protecting the eyes of the operator against the brilliance of the light produced by the cutting or welding operation and have also been provided with means whereby this additional glare-proof shield may be moved into and out of register with the protective shield. In all of the masks with which I am familiar and which have been so equipped, the means for interposing the glare-proof shield between the eyes of the operator and the work involve the use of mechanism which is liable to cause displacement of the welding rod or torch with reference to the work.

The general purpose and object of my invention is to provide, for a mask or helmet such as described, means whereby the glare-proof shield may be so interposed between the eyes of the operator and the work without liability to disturb the position of the welding rod or torch with reference to the work. The present preferred means whereby I accomplish this object will now be described in connection with the drawings forming part hereof, wherein Fig. 1 represents a side elevation of a welders' mask or helmet constructed in accordance with my invention and illustrating the manner in which the glare-proof shield may be operated; Fig. 2 is a rear elevational view of a frame, mounted in the front of a standard type of welders' mask or helmet and having my invention incorporated therewith and therein and showing the positions of the parts when the glare-proof shield is in use; Fig. 3 a sectional view corresponding to the line 3—3 of Fig. 2; Fig. 4 a sectional view corresponding to the line 4—4 of Fig. 2; and Fig. 5 an enlarged detail in section of the lower portion of the frame, showing the positions of the parts when the glare-proof shield is in its lowered or inoperative position.

Describing the parts by reference characters, 10a denotes generally parts of the front of the mask or helmet 10; and extending about and in front of the vision opening 10b is a frame 11 within which the transparent pane 12 is removably mounted, being normally held against the outer surface of the portion 10a of the mask or helmet by means of upper and lower springs 12a (see Figs. 3 and 4) which springs are mounted respectively within the upper and lower horizontal members of the frame 11 and engage with their central portion the upper and lower portions of the frame 12b for the pane 12.

13 denotes a pair of vertical supporting and guiding members suitably mounted upon the inner surface of the front portion of the mask or helmet and extending above and below the vision opening. 14 denotes a plate which is removably mounted within grooves 13a provided therefor in the said members 13 and being conveniently held in place by means of a bolt 15 having a head 15a engaging the front surface of the mask or helmet, said bolt extending through a slot 14a at the upper end of the said plate and being provided with a wing nut 15b at its inner end.

16 denotes the glare-proof shield, which is slidably mounted between the vertical members 13. The sides of this shield are mounted within and between vertically extending side members 17 which project above and below the said shield and are each provided with a hook 17a at its upper end to which hooks the lower ends of diagonally and upwardly extending coiled springs are attached, the said springs comprising lower spring members 18 which are attached at their lower ends to the said hooks, the upper ends of said lower spring members being attached to a ring 19 to which the lower ends of the diagonally and upwardly extending upper spring members 20 are attached, the upper ends of the said spring members 20 being in turn attached to suitable members 21 conveniently carried by the front portion of the mask above the side members 17.

22 denotes a brace, located below the bottom of the shield and connected to corresponding opposed portions of the side members 17. The lower ends of the side members 17 are also provided each with a hook 17b to which hooks the opposite ends of a coiled spring 23 are attached. The coiled springs 18 and 20 serve not only to lift the side members 17 and the glare-proof shield mounted therebetween when released in the manner described hereinafter, but also to exert a resilient pull upon the upper ends of the side members while the spring 23 also exerts a resilient pull upon the lower ends of the side members, thereby to resiliently clamp the glare-proof shield between the said side members. Furthermore, when the side members and the shield are removed, after disconnecting the springs 20 from their anchors 21, the springs 18 and 23 will yieldably retain the glare-proof shield therebetween but may be separated, against the resistance of said springs, whereby the shield may be removed if broken and replaced by another.

24 denotes the front branch of a light metal looped stray to which branch the shank of a pulling element 25 is attached, the said shank extending through a vertical slot 14b provided therefor in the front of the mask or helmet. 25a denotes the rear branch of the looped strap, the loop being supported upon the brace 22. It will be noted that the central portion of the loop is slotted, as shown at 24b. Secured to the brace 22 within the said slot is a light flat metal spring 26, which is preferably soldered or welded to the member 24a. Projecting rearwardly from the member 24a and above the bottom thereof, is a latch 24c. This latch forms part of the mechanism for retaining the glare-proof shield below the vision opening. As will be seen in Fig. 5, when the glare-proof shield is in its lowered or inoperative position, the latch 24c projects through a slot 14c in the plate 14 and is forced by the spring 26 into engagement with the upper wall defining said slot, said wall forming a keeper for said latch.

In order to release the latch from engagement with its keeper, the following construction is provided: 27 denotes a plate, preferably of resilient light sheet metal, which is mounted for vertical adjustment upon the plate 14, below the vision opening thereof, by means of vertical slots 27a in the plate 27 and screw bolts 28 extending through said slots and through a cross plate 29 at the rear of the plate 27, the ends of the screw bolts being provided with nuts 29a whereby the plate 27 may be adjustably secured to the plate 14, washers 30 being interposed between the front of the plate 27 and a light spring plate 31, the upper end of which is also secured to and against the rear face of the plate 14 by the screw bolts 28. The lower end of the spring plate 31 is bent into angular form, as shown at 31a (see Figs. 3 and 5), with the horizontal portion of said angular end extending through the slot 14c in the plate 14 and with the lower vertical portion extending along the front surface of the plate 14. The plate 27 is so shaped that the lower portion thereof is spaced a greater distance from the plate 14 than its upper portion.

33 denotes a keeper extending across the plate 27 above the bottom thereof and above the opening 14c, being secured to the plate 14 by means of screw bolts 34 and washers 35 and serving to limit the movement of the lower portion of the plate 27 rearwardly of the plate 14. The lower end of the plate 27 is provided with a rearwardly extending shelf 27c and the lower ends of the sides are formed into rearwardly projecting lugs 27d located above the shelf 27c. These lugs support a cross rod 36 to which the shelf 37 is pivotally supported, said shelf having a front portion adapted to engage beneath the shelf 27c when the shelf 37 is in its depressed position, the shelf 37 being pivotally supported on the cross rod 36 by means of lugs 37a.

With the parts constructed and arranged as described, it is believed that the operation can be readily understood. The plate 27 will be adjusted so that the shelf 37, when in its lowered position, can be lightly engaged by the chin of the operator when the mask is applied to his head, the glare-proof shield at this time being held in its downward position by engagement of the latch 24c with the upper wall defining the slot 14c. When the welding rod or torch has been placed in the desired starting position with reference to the work to be welded or cut, a slight depression of the chin will rock the lower end of plate 27 forwardly, thereby moving the spring plate 31 forwardly and causing the lower vertical portion 31b thereof to press the plate 24a and the spring 26 forwardly, thereby to disengage the latch from its engagement with the upper wall of the slot 14c, whereupon the springs 18 and 20 will operate to lift the glare-proof shield into register with the vision opening, there being a buffer 38 of suitable material, such as rubber, arranged above the rear of the vision opening for engagement by the upper edge of the glare-proof shield, the said buffer being shown as secured to plate 14 by means of the sheet metal keeper 39.

By pivotally connecting the shelf 37 to the lower portion of the resilient plate 27, the said shelf may be folded up into the position shown in Fig. 3, thereby enabling the assembly to be conveniently shipped, either per se or as installed in a mask or helmet.

Having thus described my invention, what I claim is:

1. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch below the said shield and carried thereby, a keeper for said latch spaced below said latch when the shield is in registration with said opening and adapted to be engaged by the latch when the said shield is below the said opening, and chin-actuated means for disengaging the latch from said keeper.

2. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch below the said shield and movable therewith, a keeper for said latch spaced below said latch when the shield is in registration with said opening and adapted to be engaged by the latch when the shield is in its lowered position, a latch-releasing meber having a portion thereof located in proximity to the said latch when the latter is in engagement with its keeper, and chin-actuated means for operating the latch-releasing member thereby to release the latch from its keeper.

3. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch carried by said shield and extending therebelow, a keeper for said latch spaced below said latch when the shield is in registration with said opening and adapted to be engaged by the latch when the shield is in its lowered position, a resilient latch-releasing member having a portion thereof arranged in proximity to the said latch when the latter is in engagement with its keeper, and chin-actuated means for pressing the said portion of said member against said latch, thereby to release the latter from engagement with said keeper.

4. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch located below the said shield and movable therewith, a plate having a portion located rearwardly of said shield when the latter is in its lowered position, a keeper for said latch carried by said plate, a spring for pressing the latch into engagement with said keeper when the shield is in its lowered position, an elongated resilient latch-releasing member secured at its upper portion to the said plate and having a lower portion thereof arranged in proximity to the said latch when the latter is in engagement with its keeper, and chin-actuated means for operating the said portion of said member thereby to release the latch from its keeper, said chin-actuated means comprising a resilient plate secured to the first mentioned plate above the said keeper and extending downwardly and rearwardly of and below the engaging portion of said latch-releasing member, and a chin-engageable shelf pivotally supported by the lower portion of the resilient plate, the said shelf and the resilient plate having interengaging portions adapted to support the shelf in a substantially horizontal position for engagement by the chin of the operator.

5. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch carried by said shield and extending therebelow, a keeper for said latch adapted to be engaged by the latter when the shield is in its lowered position, and chin-actuated means for releasing the latch from said keeper, said chin-actuated means comprising a resilient plate, and a chin-engageable shelf pivotally supported by the lower portion of the resilient plate, the said shelf and the last mentioned plate having interengaging portions adapted to hold the shelf in a substantially horizontal position for engagement by the chin of the operator, and a latch-releasing member operable by the depression of the said shelf for disengaging the latch from the keeper.

6. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch below the said shield and movable therewith, a plate having a portion located rearwardly of the said shield when the latter is in its lowered position, the said plate having an opening the upper wall of which is adapted to be engaged by the said latch thereby to retain the shield in its lowered position, an elongated leaf-type spring secured to the rear of the said plate above the opening thereof and having a projection extending into said opening in proximity to said latch and adapted to engage a portion of the latter, a resilient plate secured to the first mentioned plate above the said opening and extending downwardly rearwardly of the said spring and below the latter and adapted to engage the lower operating portion of the said spring, a horizontal shelf at the bottom of the resilient plate, and a shelf pivotally supported by the resilient plate and having the front portion thereof adapted to be engaged beneath the first mentioned shelf when the second mentioned shelf is in a substantially horizontal position.

7. A welder's mask or helmet having a vision opening therein, a glare-proof shield reciprocably mounted at the rear of said opening and movable upwardly into, and downwardly out of, registration with the opening, side members between and by means of which the sides of the said shield are mounted, said side members extending above and below the said shield, coiled springs connected at their lower ends to the upper ends of said members respectively and each having its upper end connected to a support located substantially above the opposite side member, a coiled spring connecting the side members below said shield, a latch operatively connected with the lower portion of the said shield, a keeper for said latch adapted to be engaged by the latter when the shield is in its lowered position, and means for disengaging the latch from the said keeper, thereby to enable the first mentioned coiled springs to lift the shield into register with the said vision opening.

8. A welder's mask or helmet having a vision opening therein, a glare-proof shield reciprocably mounted at the rear of said opening and movable upwardly into, and downwardly out of, registration with the opening, side members in which the sides of the said shield are mounted, said side members extending above the said shield, coiled spring members connected to the upper ends of said side members respectively and each having its upper end connected to a ring located substantially above the center of the shield, coiled spring members connected to the said ring and to supports located above said ring and said side members, respectively, a latch operatively connected with the lower portion of the said shield, a keeper for said latch adapted to be engaged by the latter when the shield is in its lowered position, and means for disengaging the latch from the said keeper, thereby to enable the springs to lift the shield into register with the said vision opening.

9. A welder's mask or helmet having a vision opening therein, a glare-proof shield reciprocably mounted at the rear of said opening and movable upwardly into, and downwardly out of, registration with the opening, spring means connected to said shield and tending to move the same upwardly into registration with said opening, a latch below the said shield and movable therewith, a plate having a portion located rearwardly of the said shield when the latter is in its lowered position, the said plate having an opening the upper wall of which is adapted to be engaged by the said latch thereby to retain the shield in its lowered position, a resilient plate secured to the first mentioned plate above the said opening and extending downwardly and rearwardly of said opening, a latch engaging member secured to the said resilient plate and having a projection extending into said opening in proximity to said latch and adapted to engage a portion of the latter, and a chin-engageable projection carried by the said resilient plate.

EDWARD S. HEBELER.